July 6, 1965  E. WEIDMANN  3,193,338
BEARING
Filed July 9, 1962
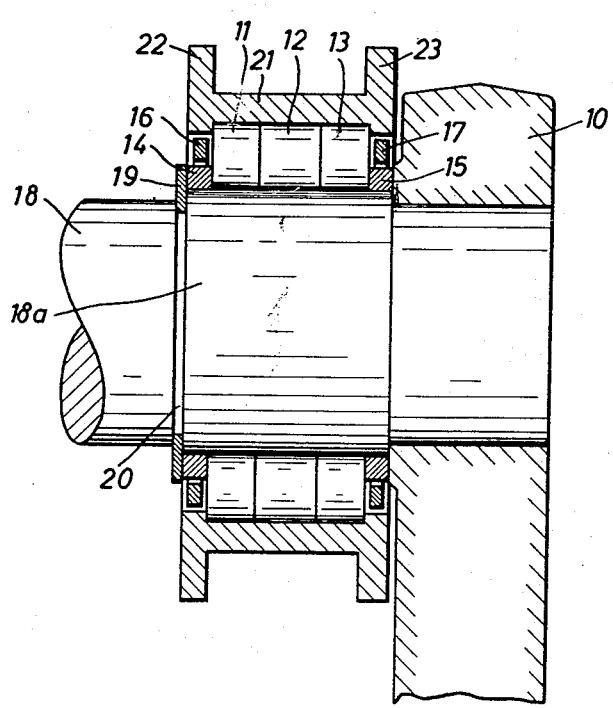

3,193,338
BEARING
Ernst Weidmann, Weinheim, Germany, assignor to Farymann Diesel Farny & Weidmann, Lampertheim, near Mannheim, Germany
Filed July 9, 1962, Ser. No. 208,643
Claims priority, application Germany, July 7, 1961, F 34,370
1 Claim. (Cl. 308—212)

The present invention relates to bearings.

It is well recognized that in order for a bearing to operate properly over a long period of time it is necessary for the race surfaces thereof which have rolling contact with the rolling bearing bodies between the race surfaces to have a precise configuration. As soon as these race surfaces become even to a slight extent out-of-round, the bearing does not operate properly and it will not have a long life. In order to maintain the trueness of the race surfaces which engage the rolling bodies the bearing races have always been made in past of a high quality material which has been very carefully machined and finished so as to provide the races with race surfaces which are smooth, hard, and very precise. Of course, these measures greatly increase the cost of the bearing.

A primary object of the present invention is to provide a bearing where the trueness of the race surfaces, particularly of the outer bearing race, can be reliably maintained over a long period of time, without any danger of this surface becoming out-of-round, without requiring the use of a high quality material and the expensive precise machining and finishing which have heretofore been required so that the cost of the bearing is greatly reduced as compared to known bearings.

It is furthermore an object of the present invention to provide a bearing structure which is considerably simpler than conventional bearing structures as a result of requiring less components.

It is also an object of the invention to provide a bearing structure which will have a wide field of use in that the bearing structure of the invention can be used in a wide variety of applications and can have varying characteristics depending upon the particular requirements of the structure in which the bearing is used.

With the above objects in view the invention includes in a bearing, an inner member having an exterior surface forming an inner race surface for the bearing, and a plurality of rolling bodies engaging this race surface. In accordance with the invention an outer race ring surrounds and engages with its inner surface these rolling bodies, and this outer race ring of the invention has integrally connected thereto at least one reinforcing flange which extends radially beyond the exterior surface of the outer race ring to reinforce this outer race ring in a manner which will prevent the inner surface of the outer race ring from losing the precision which it had when its manufacture is completed, so that as a result of the reinforcement derived from this flange the precision of the construction of the outer race ring will be maintained over a long period of use without requiring the outer race ring to be made of a high quality, expensive material and without requiring the expensive machining and finishing which are essential with conventional bearings.

The novel features which are considered as characteristic for the invention are set forth in particular in the appended claim. The invention itself, however, both as to its construction and its method of operation together with additional objects and advantages thereof, will be best understood from the following description of specific embodiments when read in connection with the accompanying drawing, in which:

The single figure shows a bearing structure according to the present invention.

According to the embodiment of the invention which is illustrated in the single figure, the inner race member is formed by a portion 18a of the shaft 18 itself. Thus, the exterior surface of the portion 18a of the shaft 18 forms the bearing surface which is engaged by the rolling bodies of the bearing. The outer race ring 21 of the bearing of the invention is provided with reinforcing flanges 22 and 23 which are integral with the race ring 21 and which project for a considerable distance outwardly beyond the exterior surface of the race ring 21, so that the race ring is strengthened to a high degree by the reinforcing flanges 22 and 23.

In an annular groove 20 formed in a shaft 18 is located a snap ring 19 which engages a spacer ring 14 to participate in the determination of the axial position of the rolling bodies, and there are shown in FIG. 2 three circumferential sets of rolling bodies 11, 12 and 13 in the form of rollers. The set of rolling bodies 11 are prevented from moving to the left beyond the position shown by the spacer 14 engaging the snap ring 19, while the set of rolling bodies 13 are prevented from moving to the right, as viewed in the figure, by the spacer ring 15 which is located between the bodies 13 and the member 10 which corresponds to the member 10 of FIG. 1. Thus, the members 10 and 19 together with the spacer rings 14 and 15 determine the axial positions of the sets of rolling bodies 11, 12 and 13 with respect to the shaft 18. A cage means 16, 17 cooperates with the rolling bodies for maintaining the circumferential spacing therebetween.

The reinforcing flanges 22 and 23 also have inwardly extending portions cooperating with the rolling bodies to determine the axial position of the outer race ring 21 of the invention, and the reinforcing flanges 22 and 23 are integrally formed with the ring 21 and are preferably of rectangular cross section. Because the flanges 22 and 23 extend through a considerable distance outwardly beyond the exterior surface of the ring 21, these flanges do indeed have a very pronounced reinforcing effect on the outer race ring 21 and maintain the true roundness of its inner surface which engages the rolling bodies 11–13 over a long period of use even though the race ring 21 is not made of a particularly high quality and expensive material and even though the machining and finishing of the inner surface of the race ring 21 is not carried out to the same extent as in expensive bearings of conventional construction.

The invention is not limited to the particular construction illustrated but is applicable to other types of bearings such as those which have only one circumferential set of rollers, for example. Moreover, the reinforcing construction of the flanges of the outer race can be adapted to the particular cross section and arrangement of the rollers. For example, the outer edges of the reinforcing flanges 22 and 23 which are furthest from the central axis of the bearing can be beveled or rounded in certain cases where such features are of advantage.

In the example described above in connection with the figure, the inner bearing race is eliminated since the inner bearing race is formed directly by the portion 18a of the shaft 18. This construction is of particular advantage inasmuch as the inner race surface which is engaged by the rollers will reliably retain its precise roundness and the entire construction of the bearing is considerably simplified. However, in accordance with the particular construction of the rolling bodies, such as, for example, a bearing where the rolling bodies are in the form of balls instead of rollers or in the case where the shaft is made of a relatively soft material, it may be desirable to provide a separate inner race between the shaft and the rolling bodies where such a bearing race will be made of a material which is correspondingly harder than the material of the shaft itself, so that in such case the rolling bodies would engage the outer surface of an inner race mounted on the shaft. However, the basic concept of the invention which resides in the reinforcement of the outer race by one or more flanges 22, 23 still would be retained.

It will be understood that each of the elements described above or two or more together, may also find a useful application in other types of bearings differing from the types described above.

While the invention has been illustrated and described as embodied in reinforced bearings, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed and described to be secured by Letters Patent is:

In a bearing, in combination, an elongated inner member having an exterior cylindrical surface forming an inner race surface; a pair of spacer rings surrounding said exterior surface and being longitudinally spaced from one another, each of said spacer rings having a given width; a plurality of circular rows of rolling bodies axially arranged one next to the other and all surrounding said exterior surface in rolling contact therewith intermediate said pair of spacer rings; means laterally adjacent respective outer surfaces of said spacer rings for preventing axial movement thereof and of said rows of rolling bodies disposed between said spacer rings; and an outer race having an inner cylindrical surface in rolling contact with said bodies, said outer race having at its ends, respectively, a pair of radial flanges of rectangular cross section integral with the remainder of said outer race and each extending inwardly beyond and outwardly beyond said outer race for reinforcing the latter to maintain the precise circular configuration of its inner surface, the inwardly extending portions of said flanges having a width substantially equal to said given width of said spacer rings and circumferentially surrounding the latter while laterally engaging the end circular rows of rolling bodies to maintain the axial position of said outer race with respect to said rolling bodies.

References Cited by the Examiner
UNITED STATES PATENTS

| | | | |
|---|---|---|---|
| 492,208 | 2/93 | Keefe | 308—182 X |
| 761,477 | 5/04 | Habicht | 308—182 |
| 885,633 | 4/08 | Montgomery | 308—182 X |
| 1,353,958 | 9/20 | Hofmann | 308—212 X |
| 1,387,993 | 8/21 | Leon | 308—184 |
| 1,592,255 | 7/26 | Branson | 308—190 X |
| 1,927,534 | 9/33 | Wooler | 308—208 X |
| 2,033,771 | 3/36 | Leister | 308—195 |
| 2,897,022 | 7/59 | Marola | 308—208 |
| 3,034,839 | 5/62 | Schoos | 308—193 |

FOREIGN PATENTS

| | | |
|---|---|---|
| 493,756 | 5/10 | France. |
| 541,498 | 5/22 | France. |

ROBERT C. RIORDON, *Primary Examiner.*
FRANK SUSKO, *Examiner.*